(12) United States Patent
Zhao et al.

(10) Patent No.: US 11,586,499 B2
(45) Date of Patent: Feb. 21, 2023

(54) METHOD, DEVICE AND COMPUTER PROGRAM PRODUCT FOR STORING DATA

(71) Applicant: EMC IP Holding Company LLC, Hopkinton, MA (US)

(72) Inventors: Jingrong Zhao, Chengdu (CN); Yi Wang, Chengdu (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 307 days.

(21) Appl. No.: 16/863,461

(22) Filed: Apr. 30, 2020

(65) Prior Publication Data

US 2021/0182146 A1    Jun. 17, 2021

(30) Foreign Application Priority Data

Dec. 11, 2019 (CN) .......................... 201911269846.4

(51) Int. Cl.
| | |
|---|---|
| *G06F 16/182* | (2019.01) |
| *G06F 11/10* | (2006.01) |
| *G06F 11/07* | (2006.01) |
| *G06F 9/54* | (2006.01) |
| *G06F 16/13* | (2019.01) |

(52) U.S. Cl.
CPC .......... *G06F 11/1076* (2013.01); *G06F 9/542* (2013.01); *G06F 11/0772* (2013.01); *G06F 16/137* (2019.01); *G06F 16/182* (2019.01)

(58) Field of Classification Search
CPC .. G06F 11/1076; G06F 16/182; G06F 16/137; G06F 9/542; G06F 11/0772
See application file for complete search history.

(56) References Cited

U.S. PATENT DOCUMENTS

2021/0034261 A1* 2/2021 Danilov ................ G06F 3/0659

* cited by examiner

*Primary Examiner* — Truong V Vo
(74) *Attorney, Agent, or Firm* — Chamberlain, Hrdlicka, White, Williams & Aughtry

(57) ABSTRACT

Embodiments of the present disclosure provide a method, device and computer program product for storing data. The method comprises creating a first data file having a naming identification at a first node in a Redundant Array of Independent Nodes (RAIN), and creating a second data file having the naming identification at a second node in the RAIN. The method further comprises creating, at a third node in the RAIN, a parity file having the naming identification, wherein the parity file is a parity result of a plurality of data files. According to embodiments of the present disclosure, files in the same parity group are configured with the same or partially the same file name.

20 Claims, 5 Drawing Sheets

METHOD, DEVICE AND COMPUTER PROGRAM PRODUCT FOR STORING DATA

CROSS-REFERENCE TO RELATED APPLICATIONS

This application claims priority to Chinese Application No. 201911269846.4 filed on Dec. 11, 2019. Chinese Application No. 201911269846.4 is hereby incorporated by reference in its entirety.

FIELD

Embodiments of the present disclosure generally relate to the field of data storage, and more specifically, to a method, device and computer program product for storing data.

BACKGROUND

Redundant Array of Independent Disks (RAID), as a data backup technology, can combine a plurality of independent physical disks in different ways to form a disk array, i.e., logical disk, in order to provide higher storage performance and reliability performance than a single disk. To restore data in a failure of a disk in the RAID, the RAID is usually provided with one or more parity blocks, such as RAID 5, RAID 6.

Redundant Array of Independent Nodes (RAIN) is a storage system and provides distributed data storage and protection in a multi-node architecture by integrating hardware and management software. Similar to the RAID, in RAIN enabled systems, data files distributed on different nodes are combined into one parity group and each parity group is provided with a controller file called a parity file, and the content of this parity file is an XOR result of the contents of the respective data files in the parity group

SUMMARY

Embodiments of the present disclosure provide a method, device and computer program product for storing data.

In one aspect of the present disclosure, there is provided a method for storing data. The method comprises creating a first data file having a naming identification at a first node in a Redundant Array of Independent Nodes (RAIN), wherein the RAIN is an array comprising a plurality of nodes and having redundant storage of data. The method further comprises creating a second data file having the naming identification at a second node in the RAIN, and creating a parity file having the naming identification at a third node in the RAIN, wherein the parity file is a parity result of at least the first data file and the second data file.

In another aspect of the present disclosure, there is provided an electronic device. The device comprises a processing unit and a memory coupled to the processing unit and stored with instructions. The instructions, when executed at the processing unit, perform acts of creating a first data file having a naming identification at a first node in a Redundant Array of Independent Nodes (RAIN), wherein the RAIN is an array comprising a plurality of nodes and having redundant storage of data. The acts further comprise creating a second data file having the naming identification at a second node in the RAIN, and creating a parity file having the naming identification at a third node in the RAIN, wherein the parity file is a parity result of at least the first data file and the second data file.

In a further aspect of the present disclosure, there is provided a computer program product tangibly stored on a non-transitory computer-readable medium and storing computer-executable instructions. The computer-executable instructions, when executed, cause a computer to perform the method or the procedure in accordance with embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of respective embodiments of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference number usually refers to the same component in the example embodiments of the present disclosure.

DETAILED DESCRIPTION OF EMBODIMENTS

Preferred embodiments of the present disclosure will be described in more detail below with reference to the drawings. Although the drawings illustrate some specific embodiments of the present disclosure, it should be appreciated that the present disclosure may be implemented in various manners and should not be limited to the embodiments explained herein. On the contrary, the embodiments are provided to make the present disclosure more thorough and complete and to fully convey the scope of the present disclosure to those skilled in the art.

As used herein, the term "comprise" and its variants are to be read as open-ended terms that mean "comprise, but not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on may refer to same or different objects unless indicated otherwise.

Figure 1:
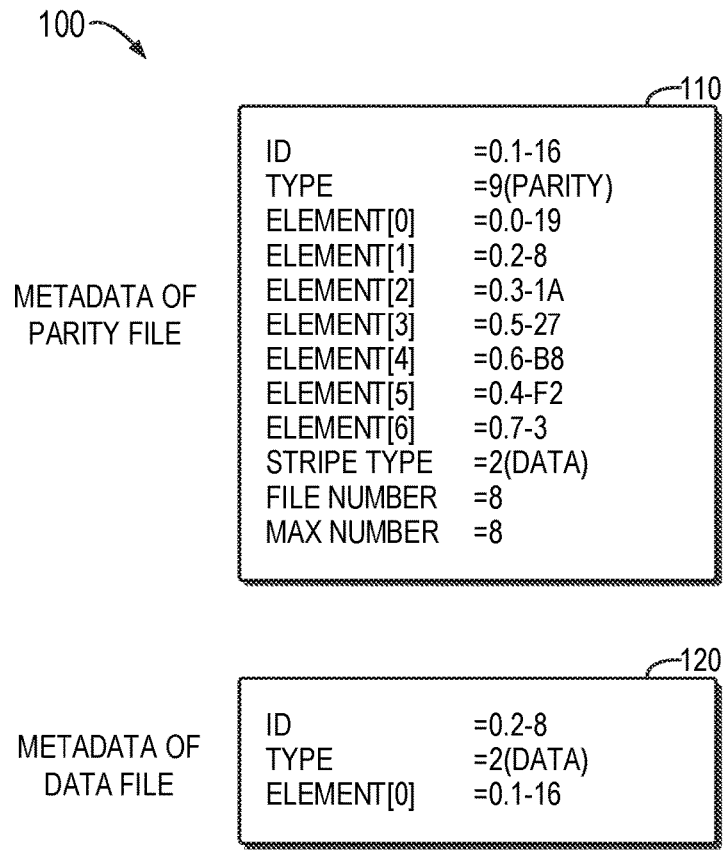
FIG. 1 illustrates a schematic diagram of metadata of a parity file and a data file in a traditional RAIN system.

In a traditional RAIN enabled multi-node system, each data file to be protected will join a parity group, and the parity group membership information is saved permanently in a disk file. Assuming that the naming schema of the RAIN enabled multi-node system is "NodeIndex-FileIndex.FileType," "0.2-8.dat" refers to a dat-type file on node 2 with index 8. FIG. 1 illustrates a schematic diagram 100 of metadata of a parity file and a data file in a traditional RAIN system. The parity group membership information is saved in metadata 110 of a parity file "0.1-16.par," which includes all members in the parity group as well as a file type, a stripe type, a file number and a maximum number and so on. The parity group membership information is also saved in metadata 120 of a data file "0.2-8.dat," which saves the parity file "0.1-16.par" associated therewith. According to FIG. 1, it is possible that members in the parity group are randomly selected, so the membership information of each parity group should be permanently recorded in the disk and queried and/or updated frequently.

A large amount of storage space is consumed by storing the parity group membership information in the metadata of the parity file and the metadata of each data file, resulting in storage space waste. In addition, many system operations, such as data update, defragmentation, garbage collection and data rebuilding, need to query the metadata to find corresponding parity files and/or data files in the parity group. However, frequent query for the metadata takes up a large amount of I/O overheads, which is inefficient and time-consuming and impacts the system performance.

Accordingly, the traditional method has the following defects. First, an additional storage space is required for recording the membership information of all parity groups. Reading/writing such metadata information is not only time-consuming, but also wastes the storage space of the system. In the example of FIG. 1, the metadata 110 may have 68 bytes. As the number of files in the storage system increases, the number of parity groups also grows, which means that more storage space will be consumed by the metadata. Second, the membership information of the parity group must be synchronized and be consistent among all nodes. Therefore, the additional synchronization work wastes the system computation resources and also increases a system risk.

As such, embodiments of the present disclosure provide a new solution of allocating a parity group for the RAIN enabled multi-node system. In accordance with embodiments of the present disclosure, a plurality of files which belong to the same parity group but are disposed on different nodes are configured with the same or partially the same file name, which reduces maintenance of the metadata of the parity file and the data file. Embodiments of the present disclosure not only save the system storage space, but also reduce unnecessary I/O operations for the metadata, thereby enhancing the system performance.

As compared with the traditional method, embodiments of the present disclosure bring about the following technical effects. First, the embodiments of the present disclosure improve the system performance, stabilize the system and avoid unnecessary I/O operations. Meanwhile, the risk of system damage caused by damages to the parity group membership information can be eliminated. Second, embodiments of the present disclosure save the storage space and decouple the nodes without requiring a storage space for recording the parity group membership information. Besides, the nodes are loosely coupled and the synchronization work of the metadata therefore is unnecessary, which further avoids inconsistency issues.

Basic principles and several example implementations of the present disclosure are explained below with reference to FIGS. 2-9. It should be understood that the example embodiments are provided merely for enabling those skilled the art to better understand and further implement the embodiments of the present disclosure, rather than limiting the scope of the present disclosure in any manner.

Figure 2:
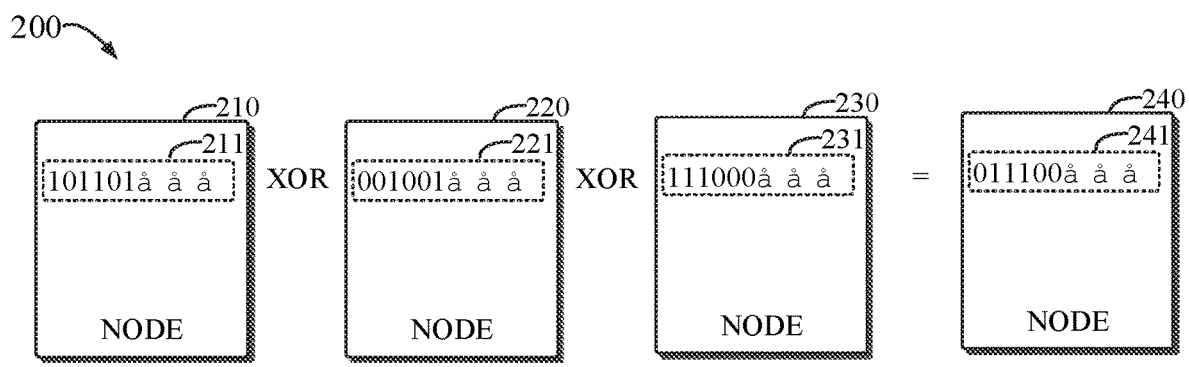
FIG. 2 illustrates a schematic diagram of an architecture of an example of a RAIN system in accordance with embodiments of the present disclosure.

FIG. 2 illustrates a schematic diagram of an architecture of an example RAIN system 200 in accordance with embodiments of the present disclosure. As shown in FIG. 2, the RAIN system 200 includes a plurality of nodes 210, 220, 230 and 240. Although only 4 nodes of the RAIN system are illustrated, the RAIN system may include more (such as 6 or 8) or less nodes (such as 3). In embodiments of the present disclosure, each node may represent a machine, a storage system or a combination thereof and so on. According to FIG. 2, one parity group may include a data file 211 on a node 210, a data file 221 on a node 220, a data file 231 on a node 230, and a parity file 241 on a node 240. The data files 211, 221 and 231 store user data, and the parity file 241, as a XOR result of the data files 211, 221 and 231, is provided for protecting the data files 211, 221 and 231. In the case of data missing or data damage due to failure of one of the data files 211, 221 and 231, the data can be restored via the parity file 241, thereby improving stability of the RAIN system.

Generally, the RAIN system can improve system availability to eliminate single node failure and provide fault tolerance across nodes. Under the circumstance of single node failure, the RAIN system may continue to process incomplete data as the data on the failed nodes can be calculated and restored in real time according to the data on other healthy nodes, and thus data lost can be avoided. During restoration of the failed node, data in the failed node may be totally restored based on data on other nodes.

Figure 3:
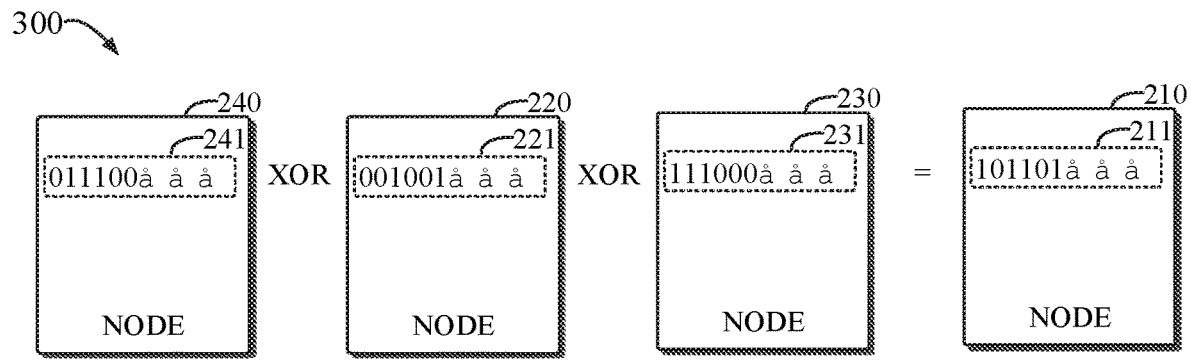
FIG. 3 illustrates a schematic diagram for restoring a failed data file in the RAIN system in accordance with embodiments of the present disclosure.

FIG. 3 illustrates a schematic diagram 300 of restoring a failed data file in the RAIN system in accordance with embodiments of the present disclosure. In a case that the data file 211 on the node 210 fails, data in the failed data file 211 may be restored according to the parity file 241 on the node 240, the data file 221 on the node 220 and the data file 231 on the node 230, wherein the nodes 240, 220 and 230 belong to the same parity group as the node 210. As shown in FIG. 3, the fault tolerance and stability of the multi-node system can be improved by use of RAIN.

Figure 4:
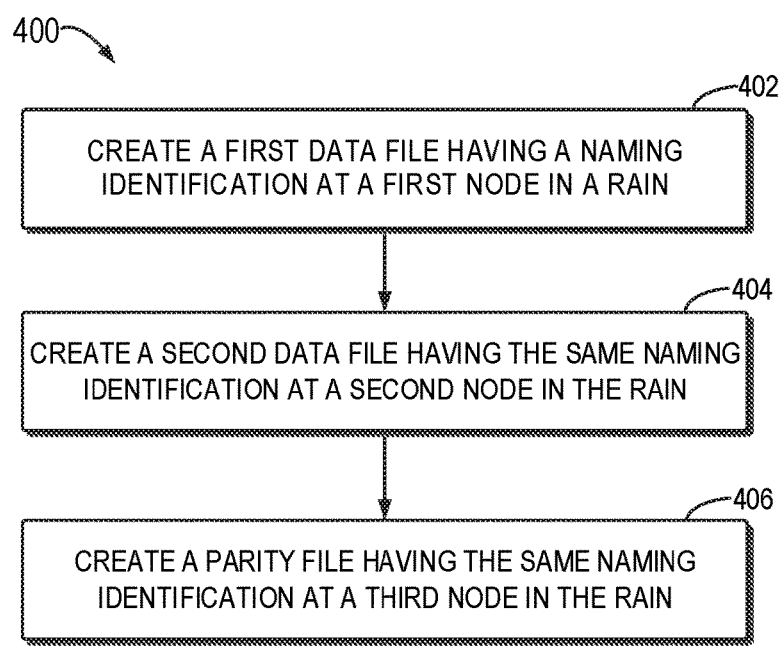
FIG. 4 illustrates a flowchart of a method for storing data in accordance with embodiments of the present disclosure.

FIG. 4 illustrates a flowchart of a method 400 for storing data in accordance with embodiments of the present disclosure. The method 400 is described with reference to an example in FIG. 5 for the purpose of better illustration.

Figure 5:
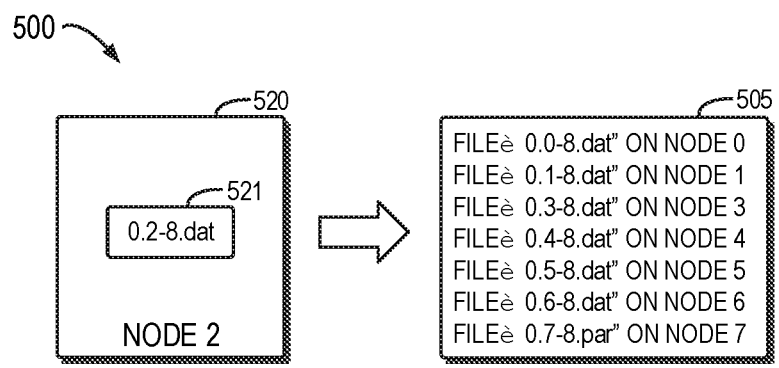
FIG. 5 illustrates a schematic diagram of a quick search of members in the parity group in accordance with embodiments of the present disclosure.

At 402, a first data file having a naming identification is created at a first node in the RAIN, wherein RAIN is an array comprising a plurality of nodes and having redundant storage of data. For example, as shown in FIG. 5, a data file named "0.2-8.dat" may be created on a node 520 using a naming identification "8," wherein "0.2" represents a node index of the node 520, "8" represents a file index and "dat" represents a file type. Continuing to refer to FIG. 5, the creation information including the naming identification "8" is then broadcast to other respective nodes in the RAIN.

Returning to FIG. 4, at 404, a second data file having the same naming identification is created at a second node in the RAIN. For example, a data file named "0.x-8.dat" is locally created at other nodes (except for parity node) in the RAIN using the naming identification "8," wherein x represents node index. As indicated by 505 of FIG. 5, a data file named "0.x-8.dat" is created on node 0, node 1, node 3, node 4, node 5 and node 6.

At 406, a parity file having the same naming identification is created at a third node of the RAIN, wherein the parity file is a parity result of at least the first data file and the second data file. As indicated by 505 of FIG. 5, a parity file named "0.7-8.par" is created on node 7, and the parity file includes a result generated from data XOR operations in all data files of the parity group.

Therefore, the method 400 includes, in accordance with embodiments of the present disclosure, configuring the files belonging to the same parity group on different nodes with the same or partially the same file name, for example, main names of the respective files all include the naming identification "8", and thus it can reduce the metadata of the parity file and the data file to be maintained. This not only saves the system storage space, but also reduces unnecessary I/O operations for the metadata, thereby enhancing the system performance.

In accordance with embodiments of the present disclosure, corresponding parity group information may be quickly obtained according to a file name of one file without searching the metadata. For example, FIG. 5 illustrates a schematic diagram 500 of a quick search of members in the parity group in accordance with embodiments of the present disclosure. In a parity group supporting 8 members, based on the naming identification "8" in the file name "0.2-8.dat" at 521 (where "0.2" indicating node identification), associated files having the naming identification "8" on respective nodes may be quickly obtained as corresponding parity group membership information without querying the metadata information. For example, the data file "0.0-8.dat" on node 0 and the parity file "0.7-8.par" on node 7 may be directly determined according to the naming identification "8." In this way, the procedure of metadata query is eliminated, and thus the system performance can be enhanced.

It should be understood that although some embodiments of the present disclosure illustrate the file names that are partially the same, the file names also can be completely identical in some embodiments. For example, the data files on the respective nodes may all be named as "8.dat." Since the respective files are located on different nodes, the same file name will not cause a system failure or error.

Figure 6:
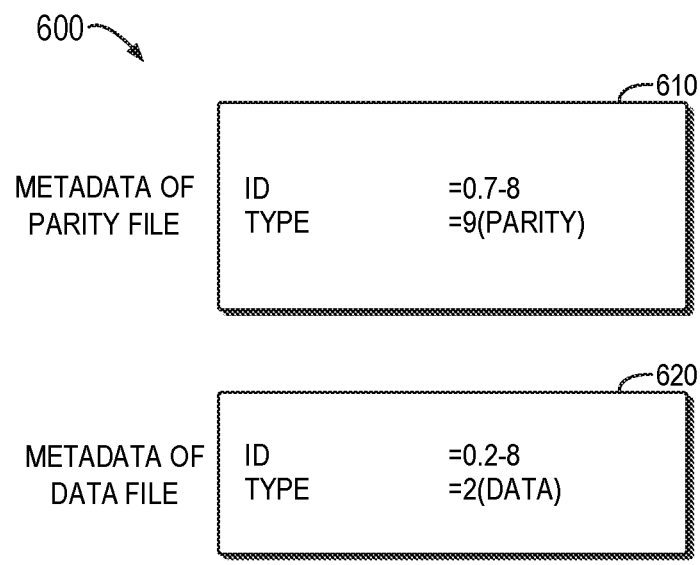
FIG. 6 illustrates a schematic diagram of metadata of a parity file and a data file in accordance with embodiments of the present disclosure.

FIG. 6 illustrates a schematic diagram 600 of metadata of a parity file and a data file in accordance with embodiments of the present disclosure. As shown in FIG. 6, in accordance with embodiments of the present disclosure, the files belonging to the same parity group have the same naming identification, so it is unnecessary to store the parity group membership information in the metadata of the parity file and the metadata of the data file. Therefore, as compared with the metadata 610 and 620 in the traditional method of FIG. 1, the metadata 610 of the parity file and the metadata 620 of the data file in accordance with embodiments of the present disclosure contain much less information, thereby reducing the system storage space effectively. Alternatively, as the file type in the file names "0.7-8.par" and "0.2-8.dat" already can identify the file as a data file or a parity one, the metadata 610 and 620 even may be omitted in some embodiments.

Figure 7:
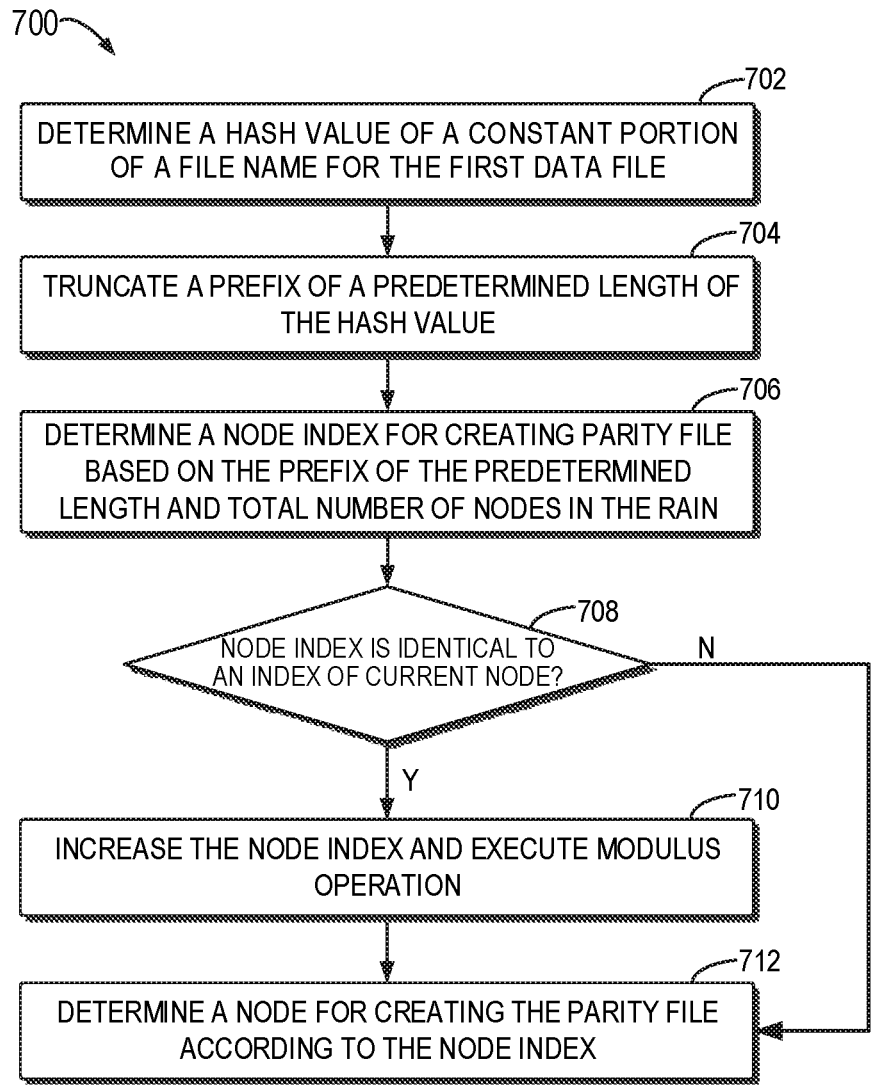
FIG. 7 illustrates a flowchart of a method for determining a node on which a parity file will be created in accordance with embodiments of the present disclosure.

FIG. 7 illustrates a flowchart of a method 700 for determining a node on which a parity file will be created in accordance with embodiments of the present disclosure. An index of the node of the parity file to be created may be calculated based on a constant portion in a file name of a data file in accordance with embodiments of the present disclosure.

At 702, a hash value of a constant portion of a file name for a first data file is determined. For example, with respect to the data file "0.2-8.dat" described in FIG. 5, the constant portion in the file name may be "8," which indicates the naming identification. In some embodiments, the hash value of "8.dat" may be calculated using SHA1 algorithm. For example, the hash value is SHA1(8.dat)= "754defe154a7baa59ddlfd45b8acb4f4ef9c2ca9."

At 704, a prefix of a predetermined length of the hash value is truncated. A first part of the hash value may be truncated, for example, in the RAIN system including 8 nodes, the first byte of the hash value may be truncated to calculate the node index for creating the parity file. In the above example, the hash value of "8.dat" is "754defe154a7baa59ddlfd45b8acb4f4ef9c2ca9" and the first byte is 0x75, i.e., hexadecimal "75." Therefore, a partial hash value is 117 in a decimal representation and 1110101 in a binary representation. It should be understood that if RAIN includes a large number of nodes, more than one byte may be selected for calculating the hash value. When A bytes are selected, a maximum of $2^{A*9}$ nodes may be supported.

At 706, the node index for creating the parity file is determined based on the prefix of the predetermined length and the total number of nodes in the RAIN. For example, the node index may be determined as (partial hash value mod total number of nodes). In the above example, the node index is (117 mod 8), i.e., 5, where mod represents a modulus operation. Therefore, the node 5 is determined as the node on which the parity file will be created. When the node on which the parity file will be created is determined using the hash value of the constant portion in the file name, the parity file may be more evenly distributed in the respective nodes of the RAIN system, thereby improving load-balancing capability of the system.

If the calculated node happens to be the current node, adjustments should be performed because it is impossible to create both a data file and a parity file of the same parity group at the same node. At 708, it is determined whether the determined node index is the index of the current node. If yes, the node index increases and the modulus operation is then executed, i.e., node index=((node index+1) mod total number of nodes) at 710, so as to obtain the updated node index. Afterwards, the node for creating the parity file is determined based on the updated node index. If the determined node index is not the index of the current node, the node of the corresponding parity file is directly determined based on the calculated node index at 712. The above approach ensures even distribution of the calculation results and further improves load-balancing capability of the system.

Figure 8:
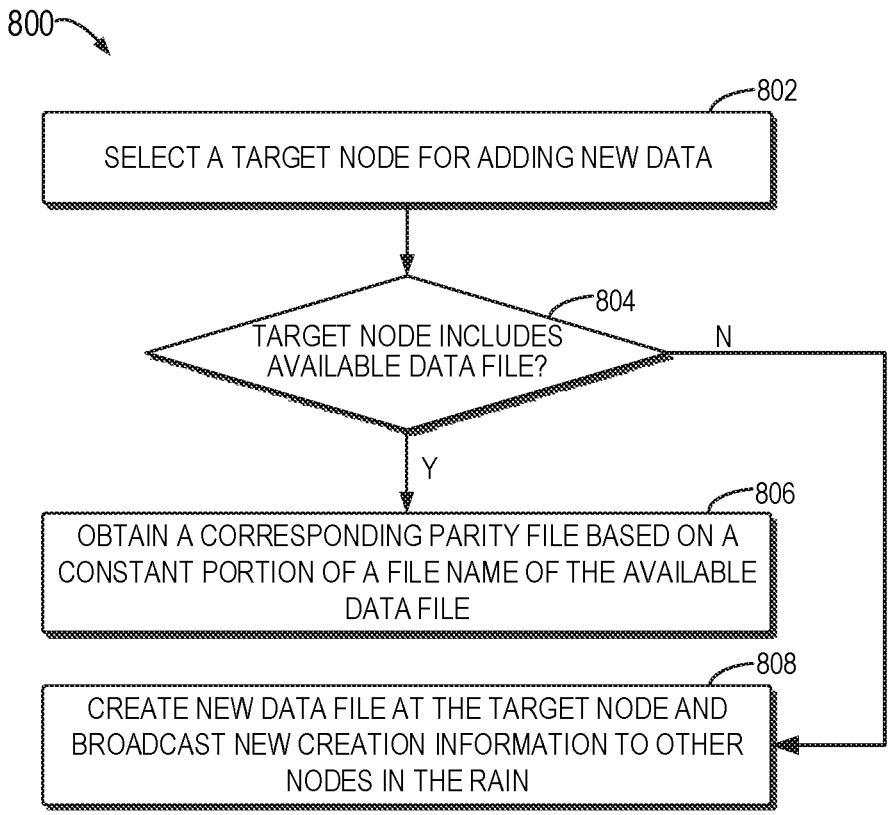
FIG. 8 illustrates a flowchart of a method for adding new data into the RAIN system in accordance with embodiments of the present disclosure.

FIG. 8 illustrates a flowchart of a method 800 for adding new data into the RAIN system in accordance with embodiments of the present disclosure, and the method 800 utilizes the parity group membership information generated in accordance with embodiments of the present disclosure.

At 802, a target node is selected from the RAIN for adding the new data. At 804, it is determined whether the target node includes an available data file for storing the new data. For example, it is determined whether there is an available data file having enough space for storing the new data.

If the available data file exists at the target node, a corresponding parity file is obtained based on the constant portion of the file name of the available data file at 806. On the contrary, if no available data file exists at the target node, a naming identification is firstly determined at the target node according to the file naming rule and a new data file is created locally at 808. Afterwards, the node index of the parity file is calculated according to the method 700 as shown in FIG. 7. Next, new creation information may be broadcast to other nodes in the RAIN, and the other nodes respectively create data files or parity files accordingly.

Therefore, the above example of the present disclosure reduces the operations of querying and updating the metadata of the data files and the parity files, and also avoids synchronizing the parity group membership information among the nodes, thereby improving the system performance.

In accordance with embodiments of the present disclosure, in a scenario where a request is to be written into a target node having no available data file, the target node creates a new data file locally and then broadcasts the creation information to other nodes. Other nodes will create files having the same or partially the same file name on their own disks. Particularly, a parity file is to be created on one of the other nodes. The files created in advance may be used next time when there is a further write request for storing data, because the data are evenly distributed among the respective nodes. Therefore, the storage space will not be wasted.

In some embodiments, the local node may send the XOR result of the new data block and the old data blocks directly to the parity file so as to update XOR data. In some embodiments, the new data in the parity file may be determined equal to (old data in the parity file) XOR (old data in the source data file) XOR (new data in the source data file).

Figure 9:
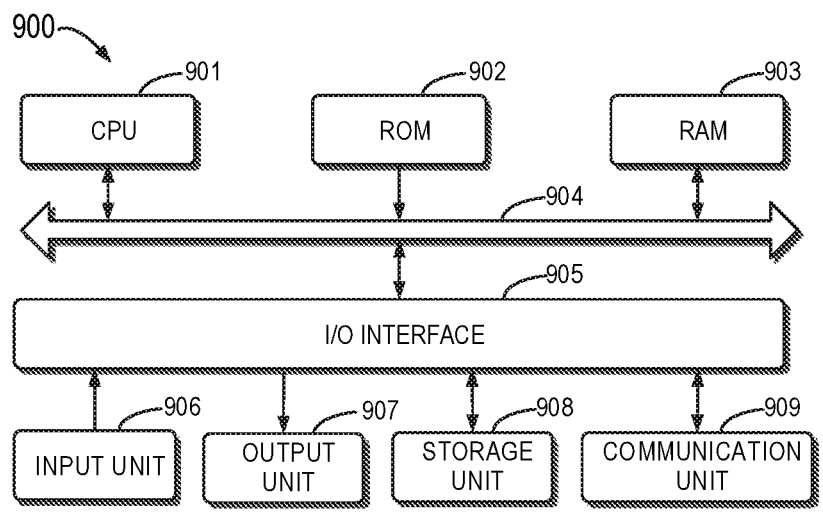
FIG. 9 illustrates a schematic block diagram of a device for implementing embodiments of the present disclosure.

FIG. 9 illustrates a schematic block diagram of a device 900 for implementing embodiments of the present disclosure. The device 900 may be a device or apparatus described by embodiments of the present disclosure. As shown, the device 900 includes a central processing unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 also can store all kinds of programs and data required by the operations of the device 900. CPU 901, ROM 902 and RAM 903 are connected to each other via a bus 904. The input/output (I/O) interface 905 is also connected to the bus 904.

A plurality of components in the device 900 is connected to the I/O interface 905, including: an input unit 906, such as keyboard, mouse and the like; an output unit 907, e.g., various kinds of display and loudspeakers; a storage unit 908, such as disk and optical disk; and a communication unit 909, such as network card, modem, wireless transceiver and the like. The communication unit 909 allows the device 900 to exchange information/data with other devices via the computer network, such as Internet, and/or various telecommunication networks.

The above described methods or procedures can be executed by the processing unit 901. For example, in some embodiments, the method can be implemented as a computer software program tangibly included in the machine-readable medium, e.g., the storage unit 908. In some embodiments, the computer program can be partially or fully loaded and/or mounted to the device 900 via ROM 902 and/or communication unit 909. When the computer program is loaded to RAM 903 and executed by the CPU 901, one or more steps or acts of the above described method or procedure can be implemented.

In some embodiments, the above described method and procedure may be implemented as a computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combination of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combination of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages and traditional procedural programming languages, e.g., "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

The computer-readable program instructions can be provided to the processing unit of a general-purpose computer, dedicated computer or other programmable data processing apparatuses to manufacture a machine, such that the instructions, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow charts and/or block diagrams.

The flow charts and block diagrams in the drawings illustrate system architecture, functions and operations that may be implemented by device, method and computer program product according to multiple implementations of the present disclosure. In this regard, each block in the flow charts or block diagrams can represent a module, a part of a program segment or code, wherein the module and the part of program segment or code include one or more executable instructions for performing stipulated logic functions. In some alternative implementations, it should be noted that the functions indicated in the blocks can also take place in an order different from the one indicated in the drawings. For example, two successive blocks can be in fact executed in parallel or sometimes in a reverse order depending on the involved functions. It should also be noted that each block in the block diagrams and/or flow charts and combinations of the blocks in the block diagram and/or flow charts can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each embodiment and technical improvements made in the market by each embodiment, or enable others of ordinary skilled in the art to understand respective embodiments of the present disclosure.

We claim:

1. A method for storing data, comprising:
   creating, at a first node in a Redundant Array of Independent Nodes (RAIN), a first data file having a naming identification, the RAIN being an array comprising a plurality of nodes and having redundant storage of data;
   creating, at a second node in the RAIN, a second data file having the naming identification; and
   creating, at a third node in the RAIN, a parity file having the naming identification, the parity file being a parity result of at least the first data file and the second data file.

2. The method of claim 1, further comprising:
   determining, based on the naming identification, the parity file and other data files which are in the same parity group as the first data file, the other data files at least comprising the second data file.

3. The method of claim 1, wherein creating the first data file having the naming identification comprises:
   in response to receiving a write request for the first node, creating, at the first node, the first data file with a file name that comprises the naming identification; and
   broadcasting creation information of the naming identification to the second node and the third node in the RAIN.

4. The method of claim 3, further comprising:
   determining, based on the file name of the first data file, the third node for creating the parity file.

5. The method of claim 4, wherein determining the third node for creating the parity file comprises:
   determining a hash value of a constant portion of the file name for the first data file;
   truncating a prefix of a predetermined length of the hash value; and
   determining, based on the prefix of the predetermined length and a total number of nodes in the RAIN, a node index for creating the parity file.

6. The method of claim 5, wherein determining the third node for creating the parity file further comprises:
   making a first determination that the node index is identical to an index of the first node,
   based on the first determination, increasing the node index; and
   making a second determination that the node index is different from the index of the first node,
   based on the second determination, determining the third node based on the node index.

7. The method of claim 1, further comprising:
   determining, for a target node selected in the RAIN, whether an available data file for storing new data exists in the target node;
   in accordance with a determination that the available data file exists in the target node, obtaining a corresponding parity file based on a part of a file name of the available data file; and
   in accordance with a determination that no available data file exists in the target node, creating a new data file at the target node and broadcasting new creation information to other nodes in the RAIN.

8. The method of claim 1, further comprising:
   in response to determining a failure of the first data file, restoring data in the first data file at least using the second data file and the parity file.

9. An electronic device, comprising:
   a processing unit; and
   a memory coupled to the processing unit and stored with instructions, the instructions, when executed by the processing unit, causing to perform a method, method comprising:
   creating, at a first node in a Redundant Array of Independent Nodes (RAIN), a first data file having a naming identification, the RAIN being an array comprising a plurality of nodes and having redundant storage of data;

creating, at a second node in the RAIN, a second data file having the naming identification; and creating, at a third node in the RAIN, a parity file having the naming identification, the parity file being a parity result of at least the first data file and the second data file.

10. The electronic device of claim 9, the method further comprising:

determining, based on the naming identification, the parity file and other data files which are in the same parity group as the first data file, the other data files at least comprising the second data file.

11. The electronic device of claim 9, wherein creating the first data file having the naming identification comprises:

in response to receiving a write request for the first node, creating, at the first node, the first data file with a file name that comprises the naming identification; and broadcasting creation information of the naming identification to the second node and the third node in the RAIN.

12. The electronic device of claim 11, further comprising:

determining, based on the file name of the first data file, the third node for creating the parity file.

13. The electronic device of claim 12, wherein determining the third node for creating the parity file comprises:

determining a hash value of a constant portion of the file name for the first data file;

truncating a prefix of a predetermined length of the hash value; and determining, based on the prefix of the predetermined length and a total number of nodes in the RAIN, a node index for creating the parity file.

14. The electronic device of claim 13, wherein determining the third node for creating the parity file further comprises:

making a first determination that the node index is identical to an index of the first node, based on the first determination, increasing the node index; and making a second determination that the node index is different from the index of the first node, based on the second determination, determining the third node based on the node index.

15. The electronic device of claim 9, the method further comprising:

determining, for a target node selected in the RAIN, whether an available data file for storing new data exists in the target node;

in accordance with a determination that the available data file exists in the target node, obtaining a corresponding parity file based on a part of a file name of the available data file; and in accordance with a determination that no available data file exists in the target node, creating a new data file at the target node and broadcasting new creation information to other nodes in the RAIN.

16. The electronic device of claim 9, the method further comprising:

in response to determining a failure of the first data file, restoring data in the first data file at least using the second data file and the parity file.

17. A computer program product tangibly stored on a non-transitory computer-readable medium and comprising computer-executable instructions, the computer-executable instructions, when executed, causing a computer to perform a method, the method comprising:

creating, at a first node in a Redundant Array of Independent Nodes (RAIN), a first data file having a naming identification, the RAIN being an array comprising a plurality of nodes and having redundant storage of data;

creating, at a second node in the RAIN, a second data file having the naming identification; and creating, at a third node in the RAIN, a parity file having the naming identification, the parity file being a parity result of at least the first data file and the second data file.

18. The computer program product of claim 17, the method further comprising:

determining, based on the naming identification, the parity file and other data files which are in the same parity group as the first data file, the other data files at least comprising the second data file.

19. The computer program product of claim 17, wherein creating the first data file having the naming identification comprises:

in response to receiving a write request for the first node, creating, at the first node, the first data file with a file name that comprises the naming identification; and broadcasting creation information of the naming identification to the second node and the third node in the RAIN.

20. The computer program product of claim 17, the method further comprising:

determining, based on the file name of the first data file, the third node for creating the parity file.

* * * * *